US010963564B2

(12) United States Patent
Chelarescu et al.

(10) Patent No.: US 10,963,564 B2
(45) Date of Patent: Mar. 30, 2021

(54) SELECTION OF RESTORE POINT BASED ON DETECTION OF MALWARE ATTACK

(71) Applicant: Microsoft Technology Licensing, LLC, Redmond, WA (US)

(72) Inventors: Filip Chelarescu, Kirkland, WA (US); Jose A Barreto, Redmond, WA (US); Meir E. Abergel, Redmond, WA (US); Benjamin N. Truelove, Lynnwood, WA (US); John D Rodrigues, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 283 days.

(21) Appl. No.: 15/942,009

(22) Filed: Mar. 30, 2018

(65) Prior Publication Data
US 2019/0303572 A1 Oct. 3, 2019

(51) Int. Cl.
*G06F 11/00* (2006.01)
*G06F 21/56* (2013.01)
(Continued)

(52) U.S. Cl.
CPC ........ *G06F 21/565* (2013.01); *G06F 11/1469* (2013.01); *G06F 21/56* (2013.01);
(Continued)

(58) Field of Classification Search
CPC ............... G06F 11/1469; G06F 21/565; G06F 2201/84; G06F 2221/034; G06F 21/56; G06F 21/568; H04L 63/1441
See application file for complete search history.

(56) References Cited

U.S. PATENT DOCUMENTS

| 7,624,443 B2 | 11/2009 | Kramer et al. |
| 7,756,834 B2 | 7/2010 | Masters et al. |

(Continued)

FOREIGN PATENT DOCUMENTS

| CN | 106570396 A | 4/2017 |
| WO | 2017053745 A1 | 3/2017 |
| WO | 2018004891 A1 | 1/2018 |

OTHER PUBLICATIONS

"International Search Report and Written Opinion Issued in PCT Patent Application No. PCT/US19/023770", dated Jun. 25, 2019, 10 Pages.

(Continued)

*Primary Examiner* — Gary S Gracia
(74) *Attorney, Agent, or Firm* — Schwegman Lundberg & Woessner, P.A.

(57) ABSTRACT

A cloud storage server accesses a plurality of server-stored files of a cloud storage account of a client device and determines that one or more compromised server-stored files from the plurality of server-stored files are affected by a malware activity. The cloud storage server determines a plurality of recovery options based on an identification of the one or more compromised server-stored files and the time at which changes to the one or more compromised server-stored files became affected by the malware activity. The plurality of recovery options comprises a suggested restore point identifying a restore time to which changes to the one or more compromised server-stored files are reverted. The cloud storage server transmits a recovery notification that indicates the plurality of recovery options to the client device.

20 Claims, 9 Drawing Sheets

(51) Int. Cl.
*G06F 11/14* (2006.01)
*H04L 29/06* (2006.01)
*G06F 12/16* (2006.01)

(52) U.S. Cl.
CPC ........ *G06F 21/568* (2013.01); *H04L 63/1441* (2013.01); *G06F 2201/84* (2013.01); *G06F 2221/034* (2013.01)

(56) References Cited

U.S. PATENT DOCUMENTS

| | | | |
|---|---|---|---|
| 7,784,098 B1 | 8/2010 | Fan et al. | |
| 8,468,604 B2 | 6/2013 | Claudatos et al. | |
| 8,484,737 B1 | 7/2013 | Swift et al. | |
| 8,881,282 B1 | 11/2014 | Aziz et al. | |
| 9,317,686 B1 | 4/2016 | Ye et al. | |
| 9,405,902 B1 | 8/2016 | Xavier | |
| 9,514,309 B1 | 12/2016 | Mann | |
| 9,680,845 B2 | 6/2017 | Langton et al. | |
| 9,734,337 B1 | 8/2017 | Patton et al. | |
| 9,756,061 B1 | 9/2017 | Roeh et al. | |
| 9,792,436 B1 | 10/2017 | Sankruthi | |
| 9,852,289 B1 | 12/2017 | Mann | |
| 10,007,795 B1* | 6/2018 | Chung | G06F 21/62 |
| 10,009,360 B1 | 6/2018 | Todd et al. | |
| 10,055,582 B1 | 8/2018 | Weaver et al. | |
| 10,140,454 B1 | 11/2018 | Spath et al. | |
| 10,187,410 B2* | 1/2019 | Greenberg | G06F 21/316 |
| 10,409,986 B1 | 9/2019 | Nantanzon et al. | |
| 10,685,114 B2 | 6/2020 | Scaife et al. | |
| 2006/0137010 A1 | 6/2006 | Kramer et al. | |
| 2007/0006304 A1 | 1/2007 | Kramer et al. | |
| 2011/0078497 A1* | 3/2011 | Lyne | G06F 11/1469 714/15 |
| 2011/0082838 A1 | 4/2011 | Niemela | |
| 2012/0124007 A1 | 5/2012 | Sten et al. | |
| 2013/0024435 A1* | 1/2013 | Poirier | G06F 16/27 707/695 |
| 2013/0067576 A1* | 3/2013 | Niemela | G06F 21/566 726/24 |
| 2013/0086683 A1 | 4/2013 | Thomas et al. | |
| 2014/0047544 A1 | 2/2014 | Jakobsson | |
| 2014/0130161 A1 | 5/2014 | Golovanov | |
| 2015/0172304 A1* | 6/2015 | Kleczynski | H04L 63/1416 726/23 |
| 2015/0178171 A1* | 6/2015 | Bish | G06F 11/1471 714/20 |
| 2016/0124665 A1* | 5/2016 | Jain | H04L 61/2007 711/162 |
| 2016/0164894 A1 | 6/2016 | Zeitlin et al. | |
| 2016/0294851 A1 | 10/2016 | Langton et al. | |
| 2017/0020353 A1 | 1/2017 | Park et al. | |
| 2017/0140156 A1 | 5/2017 | Gu et al. | |
| 2017/0177867 A1* | 6/2017 | Crofton | G06F 21/565 |
| 2017/0180394 A1 | 6/2017 | Crofton et al. | |
| 2017/0206353 A1 | 7/2017 | Jai et al. | |
| 2017/0223031 A1 | 8/2017 | Gu et al. | |
| 2017/0270293 A1 | 9/2017 | Gu et al. | |
| 2017/0324755 A1 | 11/2017 | Dekel et al. | |
| 2017/0329965 A1 | 11/2017 | Dodson | |
| 2017/0364681 A1* | 12/2017 | Roguine | G06F 21/568 |
| 2017/0371547 A1* | 12/2017 | Fruchtman | G06F 11/1448 |
| 2018/0007069 A1 | 1/2018 | Hunt et al. | |
| 2018/0018458 A1 | 1/2018 | Schmugar et al. | |
| 2018/0024893 A1 | 1/2018 | Sella et al. | |
| 2018/0027009 A1 | 1/2018 | Santos et al. | |
| 2018/0034835 A1 | 2/2018 | Iwanir et al. | |
| 2018/0048658 A1 | 2/2018 | Hittel et al. | |
| 2018/0101678 A1 | 4/2018 | Rosa | |
| 2018/0181761 A1 | 6/2018 | Sinha et al. | |
| 2018/0189488 A1 | 7/2018 | Arora et al. | |
| 2018/0189490 A1 | 7/2018 | Maciejak et al. | |
| 2018/0203997 A1* | 7/2018 | Charters | G06F 21/568 |
| 2018/0204000 A1 | 7/2018 | Charters et al. | |
| 2018/0211038 A1 | 7/2018 | Breiman et al. | |
| 2018/0212987 A1* | 7/2018 | Tamir | H04L 63/1425 |
| 2018/0248896 A1 | 8/2018 | Challita et al. | |
| 2018/0293379 A1 | 10/2018 | Dahan | |
| 2018/0357133 A1 | 12/2018 | Strogov et al. | |
| 2018/0375826 A1 | 12/2018 | Chang et al. | |
| 2019/0065745 A1 | 2/2019 | Araujo et al. | |
| 2019/0109870 A1 | 4/2019 | Bedhapudi et al. | |
| 2019/0130097 A1 | 5/2019 | Berler et al. | |
| 2019/0138727 A1 | 5/2019 | Dontov et al. | |
| 2019/0158512 A1 | 5/2019 | Zhang | |
| 2019/0201597 A1 | 7/2019 | Shelton et al. | |
| 2019/0205530 A1 | 7/2019 | Brown | |
| 2019/0228148 A1 | 7/2019 | Pohl et al. | |
| 2019/0228153 A1 | 7/2019 | Scaife et al. | |
| 2019/0303571 A1 | 10/2019 | Chelarescu et al. | |
| 2019/0303573 A1 | 10/2019 | Chelarescu et al. | |
| 2019/0303575 A1 | 10/2019 | Chelarescu et al. | |
| 2019/0306179 A1 | 10/2019 | Chelarescu et al. | |
| 2019/0347415 A1 | 11/2019 | Yavo et al. | |
| 2019/0347419 A1 | 11/2019 | Geng | |

OTHER PUBLICATIONS

"International Search Report and Written Opinion Issued in PCT Patent Application No. PCT/US19/023775", dated Jun. 25, 2019, 10 Pages.
"Non Final Office Action Issued in U.S. Appl. No. 15/941,243", dated Feb. 6, 2020, 21 Pages.
"Non Final Office Action Issued in U.S. Appl. No. 15/941,710", dated Mar. 6, 2020, 14 Pages.
"International Search Report and Written Opinion Issued in PCT Application No. PCT/US2019/023776", dated May 14, 2019, 13 Pages.
"Data Backup and recovery", Retrieved from: https://www.pcrisk.com/how-to-remove-spyware/data-backup-and-recovery, Retrieved on: Feb. 5, 2018, 6 Pages.
"Eset vs. Crypto-ransomware", In White Paper of ESET, Retrieved on: Feb. 7, 2018, 9 Pages.
"File Type Detection and Filtration Overview", Retrieved from: https://onlinehelp.opswat.com/corev3/2.4.4._File_Type_Detection_And_Filtration_Overview.html, Retrieved Date: Feb. 5, 2018, 3 Pages.
"Nextcloud presents Ransomware Protection app", Retrieved from: https://help.nextcloud.com/t/nextcloud-presents-ransomware-protection-app/19255, Aug. 8, 2017, 6 Pages.
Hatem, et al., "Malware Detection in Cloud Computing", In Journal of International Journal of Advanced Computer Science and Applications, vol. 5, Issue 4, 2014, pp. 187-192.
Muthurajkumar, et al., "Agent Based Intelligent Approach for the Malware Detection for Infected Cloud Data Storage Files", In Proceedings of Seventh International Conference on Advanced Computing, Dec. 15, 2015, pp. 1-5.
"International Search Report and Written Opinion Issued in PCT Application No. PCT/US2019/023772", dated May 7, 2019, 12 Pages.
"Non Final Office Action Issued in U.S. Appl. No. 15/941,219", dated Jul. 28, 2020, 16 Pages.
"Notice of Allowance Issued in U.S. Appl. No. 15/941,710", dated Jul. 30, 2020, 19 Pages.
"Final Office Action Issued in U.S. Appl. No. 15/941,840", dated Jul. 30, 2020, 17 Pages.
"Non Final Office Action Issued in U.S. Appl. No. 15/941,840", dated Mar. 4, 2020, 14 Pages.
"International Search Report & Written Opinion for PCT Application No. PCT/US19/023771", dated Jun. 25, 2019, 10 Pages.
"Non Final Office Action Issued in U.S. Appl. No. 15/941,840", dated Nov. 20, 2020, 15 Pages.

* cited by examiner

US 10,963,564 B2

SELECTION OF RESTORE POINT BASED ON DETECTION OF MALWARE ATTACK

TECHNICAL FIELD

The subject matter disclosed herein generally relates to a special-purpose machine that detects malware impacted files stored in a cloud storage system and determines a suggested restore point at which the malware impacted files were not impacted in the cloud storage system, including computerized variants of such special-purpose machines and improvements to such variants, and to the technologies by which such special-purpose machines become improved compared to other special-purpose machines that determine suggested restore points. Specifically, the present disclosure addresses systems and methods that detect malware impacted files in a cloud storage system, provides a suggested restore point to a client device, and restores the malware impacted files in cloud storage system based on a selection of restore point from the client device.

BACKGROUND

Malware attack such as ransomware can have a devastating effect on a computer. A ransomware malware attack modifies some files stored on the computer by encrypting the files' content and holding the encryption files for ransom. A user of the computer may not have other recourse to recover the encrypted files besides paying the ransom. If the ransom is not paid within a specified time, the files are permanently lost.

BRIEF DESCRIPTION OF THE DRAWINGS

Some embodiments are illustrated by way of example and not limitation in the figures of the accompanying drawings.

DETAILED DESCRIPTION

Figure 1:
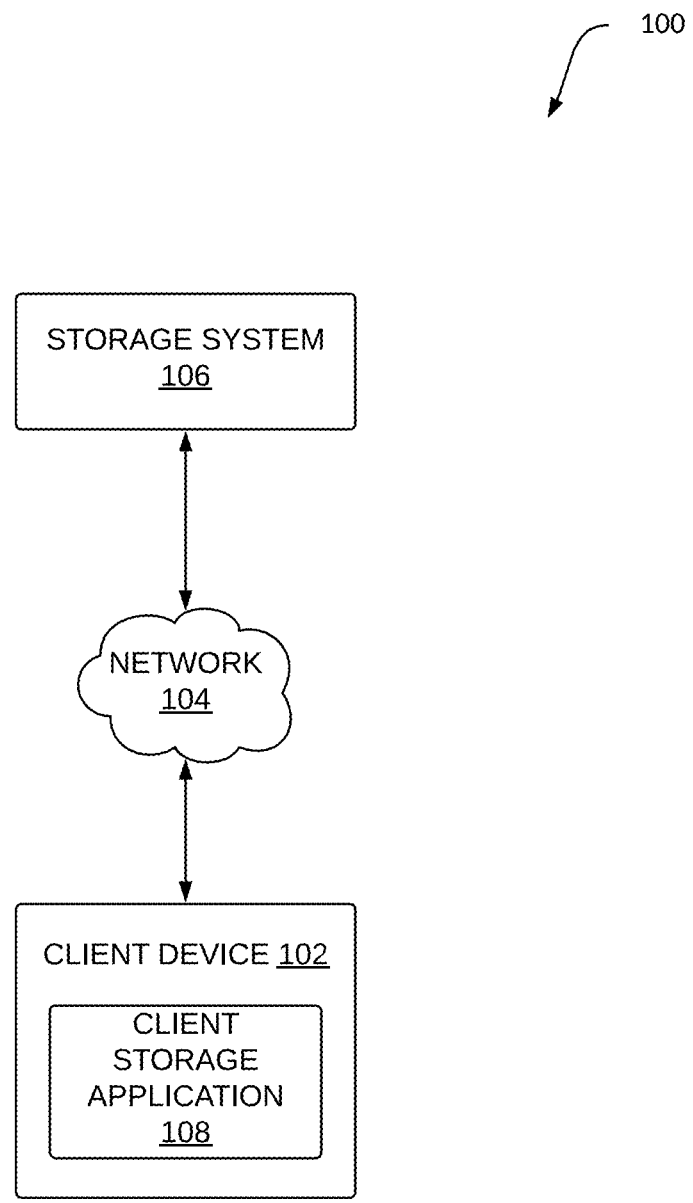
FIG. 1 is a block diagram illustrating an example environment for detecting malware impacted files, in accordance with an example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example methods (e.g., algorithms) and systems (e.g., special-purpose machines) that detect and identify ransomware impacted files stored in a cloud storage system, and determine a restore point at which the ransomware impacted files were not impacted in the cloud storage system are herein described. The files stored in the cloud storage server may be synced to a drive or folder at a corresponding client device registered with the cloud storage server. The cloud storage system performs a series of tests on individual files (and all files) in the cloud storage account associated with the client device to determine whether one or more files are impacted by ransomware.

Once the cloud storage system determines that the files are impacted by ransomware, the cloud storage server determines a suggested restore point based on an analysis of individual files uploaded for malware or ransomware impact; an analysis of heuristics for the user's drive, such as large volumes of file changes; a retroactive analysis of files changed in that time period; buffering or padding time in order to ensure a safe restore time; and analysis of user-selected restore points relative to system-selected restore points. The cloud storage system then presents the client device (e.g., or another client device that is registered with the cloud storage server with a same account as the client device that originally uploaded the files) with a preselected restore point at which to retroactively roll the ransomware impacted files to a previous (non-impacted) version of the files prior to the ransomware attack.

In another example embodiment, the cloud storage system determines the suggested restore point based on a combination of date-based factor and file-based factor. The cloud storage system further generates a recovery user interface that indicates a preselected restore point for the client device and provides additional information (e.g., file content change activity) to enable the user of the client device to select a restore point. This additional information includes, for example, the file name, the name of the user who modified the file, the name of the device that modified the file, the name of the application that modified the file, the time of the modification, and whether the file is shared. In another example embodiment, a machine learning engine at the cloud storage system uses the restore point selected by the client device to further enhance suggested recovery points and buffer time.

In one example embodiment, a cloud storage server accesses a plurality of server-stored files of a cloud storage account of a client device and determines that one or more compromised server-stored files from the plurality of server-stored files are affected by a malware activity. The cloud storage server determines a plurality of recovery options based on an identification of the one or more compromised server-stored files and the time at which the one or more compromised server-stored files became affected by the malware activity. The plurality of recovery options comprises a suggested restore point identifying a restore time to which changes to the one or more compromised server-stored files are reverted. The cloud storage server transmits a recovery notification that indicates the plurality of recovery options to the client device.

As a result, one or more of the methodologies described herein facilitate solving the technical problem of determining a safe restore point to which the client device should restore. As such, one or more of the methodologies described herein may obviate a need for certain efforts or computing resources that otherwise would be involved in guessing a recovery time, restoring the files at a much earlier time or a much later time than the detection time of the ransomware impacted files, and presenting all files changes for the user to manually select one file at a time. As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

FIG. 1 is a block diagram illustrating an example environment 100 for environment for detecting ransomware impacted files, in accordance with an example embodiment. In example embodiments, a storage system 106 stores copies of files from the client device 102. The storage system 106 will be discussed in more detail in connection with FIG. 2 below.

The storage system 106 is coupled, via a network 104, to one or more client devices (e.g., client device 102). One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The client device 102 includes a client storage application 108 configured to communicate files (e.g., send and receive versions of files) or modifications in the files with the storage system 106. For example, the client storage application 108 syncs local files stored in a preset directory or folder at the client device 102 with a corresponding directory or folder at the storage system 106. Therefore, changes made to a local file in the preset folder of the client device 102 are propagated to a corresponding remote file (a copy of the local file) in the storage system 106. In one example, the client storage application 108 registers the client device 102 with the storage system 106 and communicates copies of the user-selected local files at the client device 102 at the storage system 106. In another example, changes made to a remote file at the storage system 106 are propagated to a corresponding local file in the client device 102.

In one example embodiment, the storage system 106 detects whether one or more files stored at the storage system are impacted (or also referred to as infected) by malware (e.g., ransomware) and determines a suggested restore point based on an analysis of files impacted by the malware. The storage system 106 then presents the client device 102 recovery options (e.g., a preselected (or suggested) restore point at which to retroactively roll the malware impacted files to a previous (non-impacted) version of the files prior to the malware attack). The storage system 106 receives, from the client device 102, a selection of a restore point from the recovery options and restores the files in the storage system 106 to a version of the files corresponding to the user-selected restore point.

In another example embodiment, the storage system 106 detects whether a modified file stored at the storage system is impacted (or also referred to as infected) by malware (or ransomware). The storage system 106 generates a notification to the client storage application 108 of the detected ransomware and seeks a confirmation or validation from the client device 102. The storage system 106 uses the feedback (e.g., validation/confirmation) to provide additional reference data to a learning engine to increase its accuracy of detecting future ransomware activity at the storage system 106 and avoiding false positives.

The client device 102 comprises, but is not limited to, a smartphone, tablet, laptop, multi-processor system, microprocessor-based or programmable consumer electronics, game console, set-top box (STB), or any other device that a user utilizes to communicate over the network 104. In example embodiments, the client device 102 comprises a display module (not shown) to display information (e.g., in the form of specially configured user interfaces). In some embodiments, the client device 102 may comprise one or more of a touch screen, camera, keyboard, microphone, and Global Positioning System (GPS) device.

Any of the systems or machines (e.g., databases, devices, servers) shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 10, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or machines illustrated in FIG. 1 may be combined into a single system or machine, and the functions described herein for any single system or machine may be subdivided among multiple systems or machines. Additionally, any number and types of client device 102 may be embodied within the environment 100. Furthermore, some components or functions of the environment 100 may be combined or located elsewhere in the environment 100. For example, some of the functions of the client storage application 108 may be embodied at the storage system 106.

Figure 2:
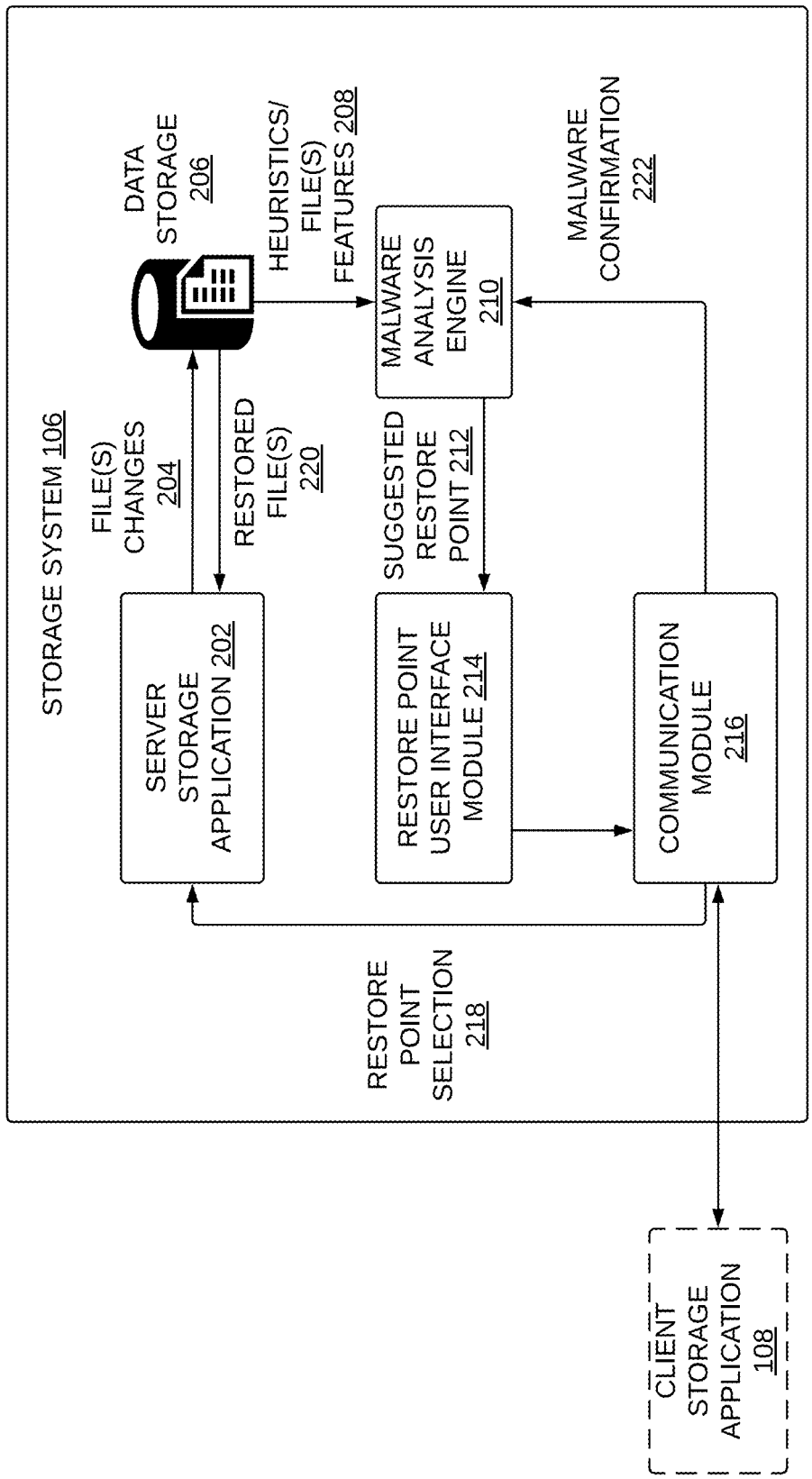
FIG. 2 is a block diagram illustrating components within a storage system, in accordance with an example embodiment.

FIG. 2 is a block diagram illustrating components within a storage system, in accordance with an example embodiment. In example embodiments, the storage system 106 performs operations to detect malware impacted files stored in a cloud storage system to determine a suggested restore point at which the ransomware impacted files were not impacted in the cloud storage system and to restore the files (associated with an account of a client device) in the cloud storage system based on a restore point selected by a user of the client device. To enable these operations, the storage system 106 comprises a server storage application 202, a data storage 206, a malware analysis engine 210, a restore point user interface module 214, and a communication module 216, all of which are configured to communicate with each other (e.g., over a bus, shared memory, or a switch), in accordance with an example embodiment.

The server storage application 202 is configured to interface and communicate with the client storage application 108. The server storage application 202 communicates with the client storage application 108 via the communication module 216. For example, the server storage application 202 receives a request from the client storage application 108 to add the new file in the data storage 206 or to replace an existing corresponding file with a modified file in the data storage 206.

In other example embodiments, the server storage application 202 receives and sends copies of files between the storage system 106 and the client device 102. In one example, the server storage application 202 is configured with the client storage application 108 to store one or more versions of copies of files received from the client storage application 108. For example, the server storage application 202 registers the client storage application 108 and forms a folder or a directory (that corresponds to a user-selected folder or directory at the client device 102) at the storage system 106. Therefore, any changes to a file (e.g., file changes 204) in the folder at the client device 102 is replicated to the corresponding file in the corresponding folder at the storage system 106. In another example embodiment, the server storage application 202 identifies historical changes to a file stored at the storage system 106 based on the different versions of a file received from the client storage application 108. The server storage application 202 stores file changes 204 (e.g., a new file or a modified file) in the data storage 206.

The data storage 206 is configured to store the files received from the server storage application 202. The files may be copies of files stored at the client device 102. In one example, the data storage 206 is configured to store several versions of the files based on the date and time from the different versions of the files. The files may include attributes such as file name, file extension, and size. Those of ordinary skills in the art will recognize that the files can include other different types of attributes.

In example embodiments, the data storage 206 is configured to store files and user information for individual users in user specific data stores or databases (hereinafter collectively referred to as a "user data structure"). For instance, each user data structure may correspond to a folder and/or a directory of the client device 102 of a user. While the data storage 206 is shown to be a part of the storage system 106, in some embodiments, the data storage 206 may be located elsewhere in the environment 100 and be communicatively coupled to the storage system 106. Additionally, any number of data storage 206 may be used to store the user data structures.

In example embodiments, the data storage 206 provides heuristics and file features 208 of the files associated with the client storage application 108 to the malware analysis engine 210. In another example embodiment, the data storage 206 provide the malware analysis engine 210 with access to the files associated with the client storage application 108.

The malware analysis engine 210 performs a series of tests on files associated with the client storage application 108 to detect whether one or more files associated with the client storage application 108 are impacted with malware. Once the malware analysis engine 210 determines that one or more files stored in the data storage 206 and associated with the client storage application 108 is impacted with malware, the malware analysis engine 210 determines a suggested restore point 212 to the restore point user interface module 214. The malware analysis engine 210 will be discussed in more detail in connection with FIG. 3 below.

The restore point user interface module 214 generates a user interface that provides a malware notification and recovery information to a user of the client storage application 108 to notify the user of the malware activity, provide a visual representation of a suggested restore point, and enable the user to select a restore point. An example of a graphical user interface generated by the restore point user interface module 214 is discussed in more detail in connection with FIG. 9 below.

The communication module 216 is configured to exchange communications with the client storage application 108. For example, the communication module 216 transmits the malware notification and recovery information to the client storage application 108. The communication module 216 receives a restore point selection 218 from the client storage application 108. The user-selected restore point identifies the restore point at which the user wishes to restore the files in the data storage 206. The user-selected restore point may be the same or different from the suggested restore point provided by the malware analysis engine 210. In another example embodiment, the user-selected restore point identifies specific files (that are identified by the user) to restore to either a user-selected restore time or a system-selected restore time (e.g., restore time suggested by the malware analysis engine 210). The communication module 216 provides the restore point selection 218 to the server storage application 202 to execute the recovery (e.g., recovering the malware impacted files to the restored files 220 based on the restore time selected by the user of the client device 102).

The communication module 216 may also receive a malware confirmation 222 from the client storage application 108. The communication module 216 communicates the malware confirmation 222 to the malware analysis engine 210.

In other example embodiments, the communication module 216 includes a user interface module (not shown) that is configured to cause presentation of specially configured user interfaces (e.g., restore point user interface) on the client device 102 that includes a visual indication of the malware-impacted file and other pertinent information (e.g., time of infection, last modified author, size change), and the suggested restore point. The user interface module generates and transmits instructions to the client storage application 108 to render and display the user interfaces.

Any one or more of the components (e.g., modules, engines) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices. The storage system 106 may comprise other components not pertinent to example embodiments that are not shown or discussed. Further still, one or more of the components of the storage system 106 may be located at one or more of the client devices.

Figure 3:
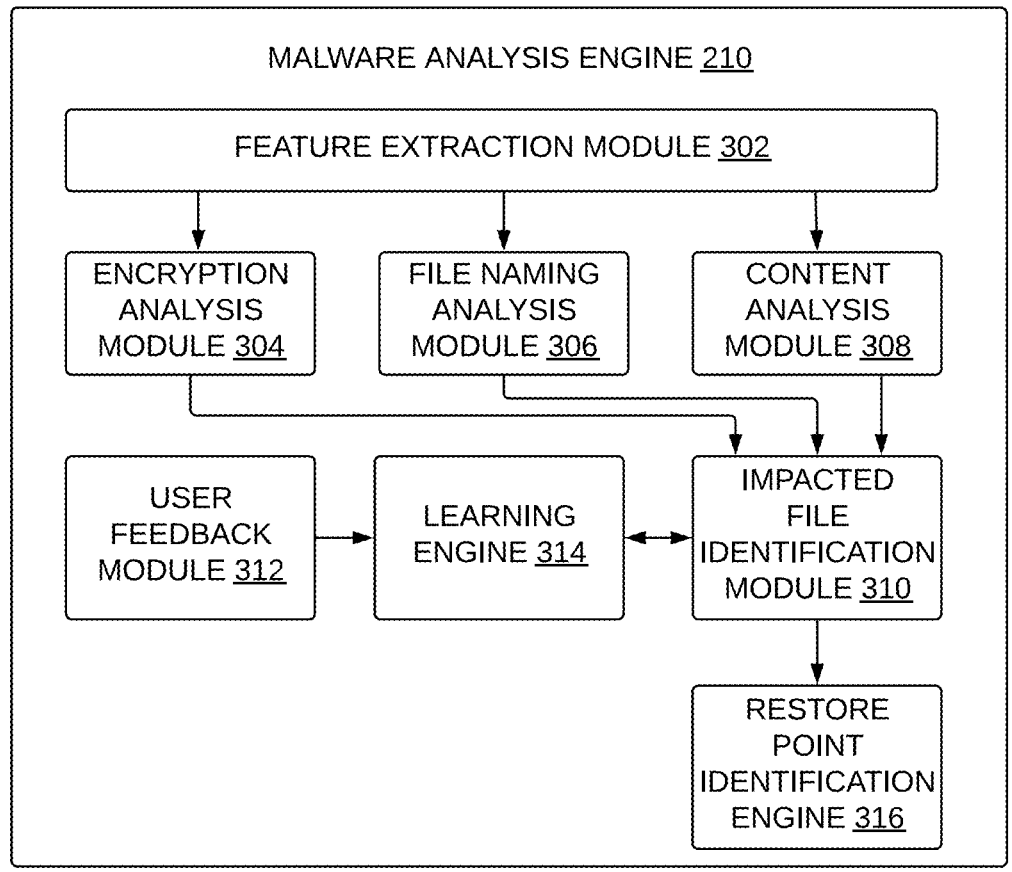
FIG. 3 is a block diagram illustrating components within a malware analysis engine, in accordance with an example embodiment.

FIG. 3 is a block diagram illustrating components within a malware analysis engine, in accordance with an example embodiment. The malware analysis engine 210 performs operations to detect malware impacted files stored in the data storage 206 and determine a suggested restore point for the client device 102 associated with the malware impacted files in the data storage 206. To enable these operations, the malware analysis engine 210 comprises a feature extraction module 302, an encryption analysis module 304, a file naming analysis module 306, a content analysis module 308, a user feedback module 312, a learning engine 314, an impacted file identification module 310, and a restore point identification engine 316, all of which are configured to communicate with each other (e.g., over a bus, shared memory, or a switch) in accordance with an example embodiment.

The feature extraction module 302 extracts features from one or more files stored at the data storage 206. In one example, the feature extraction module 302 extracts features from a last modified file or a new file received from the client storage application 108 via the server storage application 202. Examples of features (also referred to as attributes or properties in the present document) include, but are not limited to, attributes of the files such as file encryption status, extension name, date of creation, date of modification, versioning number, author name, type of media, and compression status.

The encryption analysis module 304 determines the encryption status of one or more files based on the extracted features. For example, the encryption analysis module 304 determines that the encryption status of the modified file has changed (e.g., from non-encrypted to encrypted: a modified file is now encrypted whereas a previous version of the corresponding file is non-encrypted). In another example, the encryption analysis module 304 determines that the new file is encrypted. The encryption analysis module 304 provides the encryption status of the new or modified file to the impacted file identification module 310.

The file naming analysis module 306 determines a file name and an extension name of one or more files based on the extracted features. For example, the file naming analysis module 306 compares the name of the files with the file naming patterns of known ransomware file names. In another example embodiments, the file naming analysis module 306 determines whether there is an increase in file renames in the folder of the data storage 206 corresponding to the folder in the client device 102. In other example embodiments, the file naming analysis module 306 monitors for text strings (e.g., ransom notes) associated with known ransomware. The file naming analysis module 306 provides the ransomware file name matching results to the impacted file identification module 310.

The content analysis module 308 determines whether a file content does not match its file type (based on its extension name, header, or mime type). For example, the content analysis module 308 determines that the content in a .jpg file is not an image. The content analysis module 308 provides its content analysis result of the new or modified file to impacted file identification module 310.

The user feedback module 312 is configured to receive feedback (e.g., confirmation and validation of the presence of ransomware in a new or modified file) from the client storage application 108 of the client device 102. For example, the user feedback module 312 receives a ransomware confirmation from the client storage application 108 based on a user feedback at the client storage application 108. The user feedback indicates whether the new or modified file is indeed impacted by ransomware. The user feedback module 312 provides the user feedback (e.g., malware confirmation 222) to the learning engine 314.

In another example embodiment, the user feedback module 312 is configured to receive a restore point selected by a user of the client storage application 108 of the client device 102. The user feedback module 312 provides the user-selected restore point to the learning engine 314.

The learning engine 314 (e.g., a machine learning algorithm) manages a learning model for identifying ransomware files. The learning engine 314 accesses file information (associated with the client device 102) from the data storage 206. The file information includes attributes, extensions, and features (including user feedback) of old, new, and modified files associated with the client device 102. Using the file information, the learning engine 314 can identify trends or patterns. For example, the learning engine 314 learns, based on file extensions, that the new file is actually not related to a ransomware as confirmed by the user of the client device 102 because the user has named the file to a name similar to a known ransomware. In another example, the learning engine 314 learns that a file that is encrypted and has a file extension name with a particular naming pattern (e.g., previously associated with existing ransomware) is likely a ransomware.

Based on the learning model, the learning engine 314 can, in one embodiment, suggest to the impacted file identification module 310 that the new or modified file is or is not likely a ransomware. In a further embodiment, the learning engine 314 updates a list of files that have been confirmed or validated as safe (non-impacted by ransomware) from the client device 102. All of the trends or patterns identified by the learning engine 314 may be stored in the data storage 206 and provided to the impacted file identification module 310 for further processing.

In other example embodiments, the learning engine 314 determines the number of files (in the account of the client device 102 in the data storage 206) being updated, deleted, created, encrypted, and with suspicious extensions, and generates a determination or confidence level that one of the files (or the user account) is impacted by a malware or ransomware attack.

In another example embodiment, the learning engine 314 compares the user-selected restore time to the system-suggested restore time to further improve future suggested restore time. For example, a buffer time may be added or reduced based on the user-selected restore time in comparison to the system-suggested restore time. The learning engine 314 may learn that most users (e.g., a majority of users of the storage system 106) consistently prefers a buffer time of 1 hour instead of 30 minutes (prior to the detection of the malware impact).

The impacted file identification module 310 receives the results from the encryption analysis module 304, the file naming analysis module 306, the content analysis module 308, and the learning engine 314 to determine whether the files are likely impacted by malware. In example embodiments, the impacted file identification module 310 provides a range of confidence that the files are likely impacted by a ransomware. For example, the impacted file identification module 310 determines that a modified file is likely impacted by a ransomware based on a determination that the modified file is now encrypted (and an immediate previous version of the modified file was non-encrypted), that the extension name of the file matches portions of text strings associated with known ransomware, and based on previous user feedback (from the client device or from other users or client devices with files sharing the same attributes or features).

The restore point identification engine 316 determines a suggested restore time for a suggested restore point based on the results of the impacted file identification module 310. For example, the impacted file identification module 310 determines a suggested restore time based on the time of the detected malware attack as identified by the impacted file identification module 310. The restore point identification engine 316 may add a buffer time to the time of the detected malware attack. For example, if the impacted file identification module 310 determines that the files have been compromised by a malware attack at 2 pm, the restore point identification engine 316 may suggest a restore time of 1:30 pm by adding a buffer time of 30 minutes. The restore point identification engine 316 will be discussed in more detail in connection with FIG. 4 below.

Figure 4:
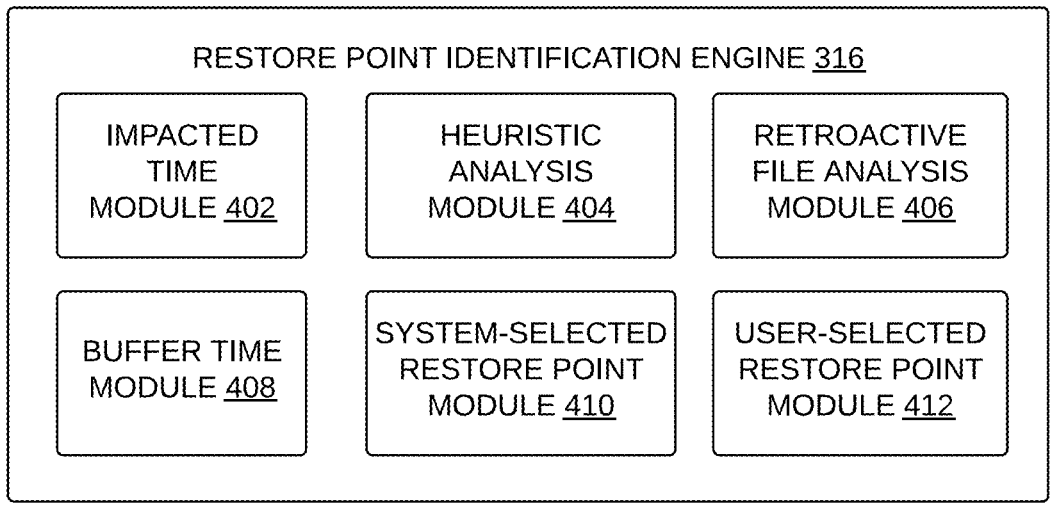
FIG. 4 is a block diagram illustrating components within a restore point identification engine, in accordance with an example embodiment.

FIG. 4 is a block diagram illustrating components within a restore point identification engine, in accordance with an example embodiment. The restore point identification engine 316 performs operations to determine a suggested restore point for malware impacted files stored in the data storage 206. To enable these operations, the restore point identification engine 316 comprises an impacted time module 402, a heuristic analysis module 404, a retroactive file analysis module 406, a buffer time module 408, a system-selected restore point module 410, and a user-selected restore point module 412, all of which are configured to communicate with each other (e.g., over a bus, shared memory, or a switch), in accordance with an example embodiment.

The impacted time module 402 identifies the time at which one or more files (associated with the client device 102) in the data storage 206 are impacted by malware based on the impacted file identification module 310. For example, the impacted time module 402 determines that a first group of files in the data storage 206 have been impacted by malware at 1 pm and a second group of files in the data storage 206 at 2 pm.

The heuristic analysis module 404 performs a series of heuristics analysis, including, for example:
file churn (the number of files which are modified in a specific time, as a raw number or as a percentage of the account size)
how many files are encrypted or otherwise increase in entropy
external signals such as from an anti-malware application of the client device 102

The retroactive file analysis module 406 performs a retroactive analysis on files around a time that the files have been modified to determine whether the files have been impacted by the malware. For example, file A is changed around 1:00 pm, and file B is changed around 1:03 pm. The retroactive file analysis module 406 directs the impacted file identification module to detect malware activity in other files between 1:00 pm and the 1:03 pm to identify which files are infected.

The buffer time module 408 determines a buffer time to be added to the detected time of malware attack. The buffer time may be set by the user or by the system. In one example embodiment, the buffer time module 408 communicates with the learning engine 314 to adjust the buffer time based on the user feedback. For example, if the learning engine 314 determines that the user routinely goes further back than the suggested restore point, the learning engine 314 instructs the buffer time module 408 to increase the buffer time.

The system-selected restore point module 410 determines a suggested restore point (or restore time) based on the detected time of malware activity and the buffer time provided by the buffer time module 408. For example, if the buffer time is 15 minutes, then the system-selected restore point module 410 generates a suggested restore time of 1:45 pm if the detected time of the detected malware attack occurred at 2 pm.

The user-selected restore point module 412 receives the restore point selected by the user and provides the user-selected restore point to the server storage application 202 for execution (e.g., to restore files to the user-selected restore point) and to the user feedback module 312 to improve the learning algorithm (for the buffer time) at the learning engine 314.

Figure 5:
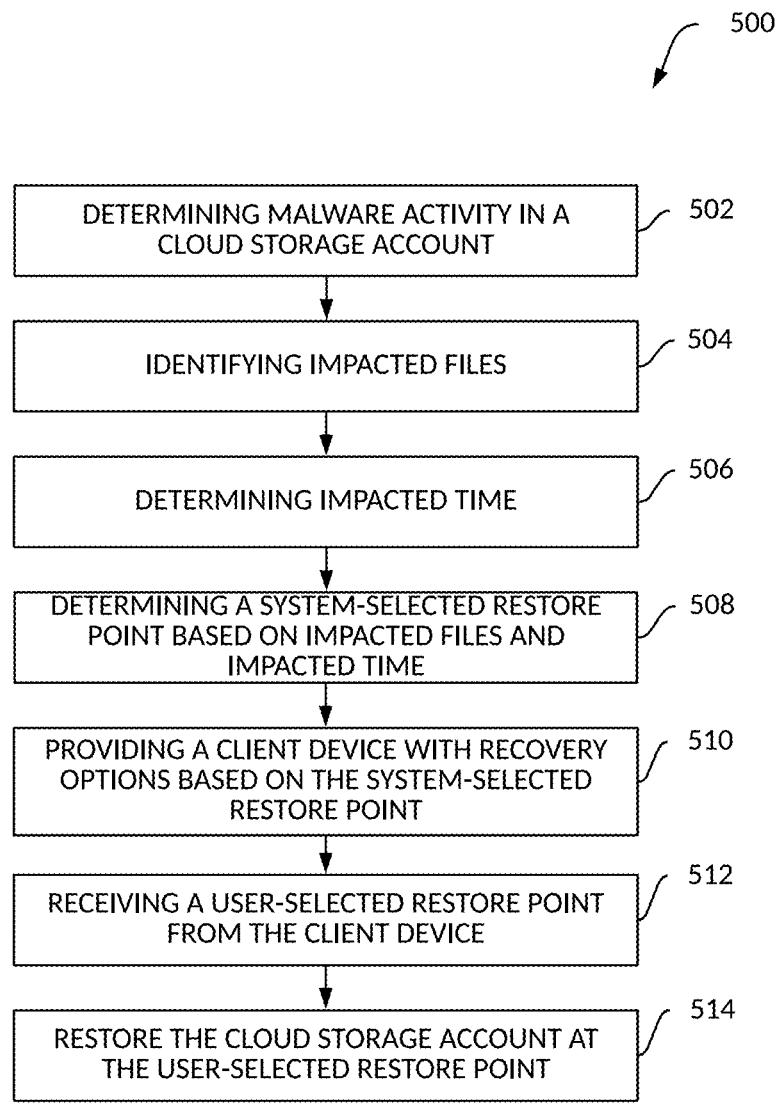
FIG. 5 is a flow diagram of a method for determining a suggested restore point, in accordance with an example embodiment.

FIG. 5 is a flow diagram of a method for determining a suggested restore point, in accordance with an example embodiment. Operations in the method 500 may be performed by the storage system 106, using components (e.g., modules, engines) described above with respect to FIG. 2. Accordingly, the method 500 is described by way of example with reference to the malware analysis engine 210. However, it shall be appreciated that at least some of the operations of the method 500 may be deployed on various other hardware configurations or be performed by similar components residing elsewhere. For example, some of the operations may be performed at the client device 102.

In operation 502, the malware analysis engine 210 determines malware activity in the cloud storage account of the client device 102 in the data storage 206.

In operation 504, the malware analysis engine 210 identifies files impacted by the malware activity.

In operation 506, the malware analysis engine 210 identifies an impacted time (e.g., time at which the files have become impacted by the malware).

In operation 508, the malware analysis engine 210 determines a system-selected restore point based on the impacted files and the impacted time.

In operation 510, the malware analysis engine 210 provides the client device 102 with recovery options based on the system-selected restore point via the restore point user interface module 214 and the communication module 216.

In operation 512, the communication module 216 receives a user-selected restore point (e.g., restore point selection 218) from the client storage application 108 of the client device 102.

In operation 514, the server storage application 202 restores the cloud storage account at the user-selected restore point.

Figure 6:
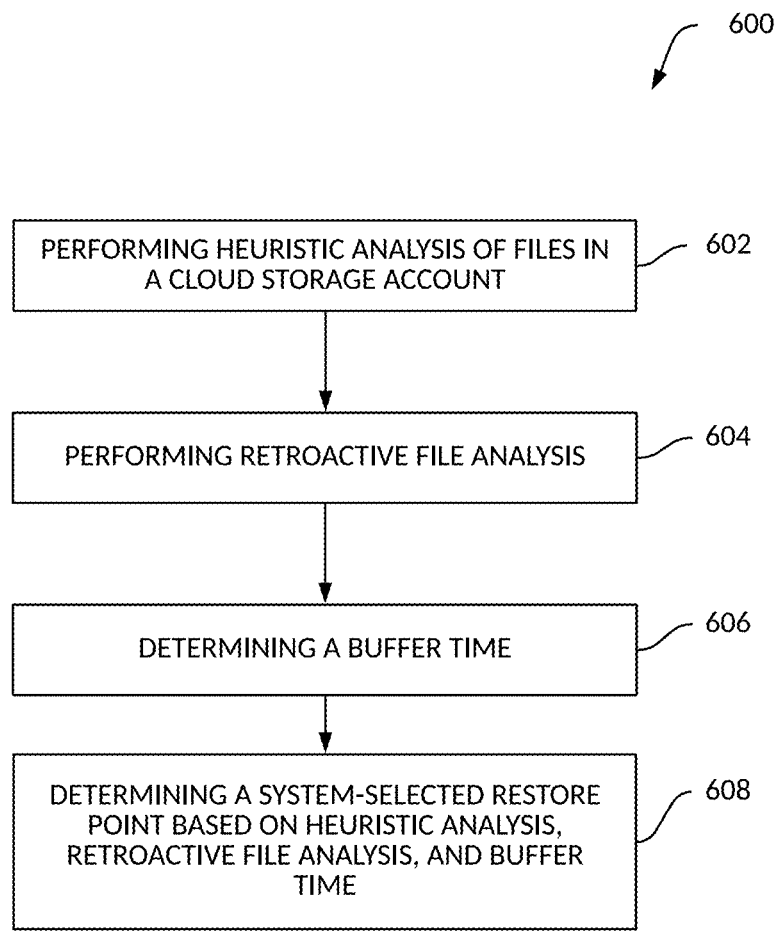
FIG. 6 is a flow diagram of a method for determining a suggested restore point, in accordance with another example embodiment.

FIG. 6 is a flow diagram of a method for determining a suggested restore point, in accordance with another example embodiment. Operations in the method 600 may be performed by the restore point identification engine 310, using components (e.g., modules, engines) described above with respect to FIG. 4. Accordingly, the method 600 is described by way of example with reference to the restore point identification engine 310. However, it shall be appreciated that at least some of the operations of the method 600 may be deployed on various other hardware configurations or be performed by similar components residing elsewhere. For example, some of the operations may be performed at the client device 102.

In operation 602, the heuristics analysis module 404 performs heuristic analysis of files in a cloud storage account in the data storage 206. For example, the heuristics analysis module 404 determines an entropy based on changes in a group of files.

In operation 604, the retroactive file analysis module 406 performs retroactive file analysis on one or more files in the cloud storage account in the data storage 206. For example, file A is changed around 1:00 pm, and file B is changed around 1:03 pm. The retroactive file analysis module 406 directs the impacted file identification module to detect malware activity in other files between about 1:00 pm and about 1:03 pm to identify which files are infected. In another example, the retroactive file analysis module 406 directs the impacted file identification module to detect malware activity in other files between about 12:50 pm (a preset buffer time such as a 10 minutes before 1 pm) and about 1:13 pm (10 minutes after 1:03 pm) to identify which files are infected.

In operation 606, the buffer time module 408 determines a buffer time. The buffer time can be user-defined (e.g., preference of one day before the impacted event) or system-defined based on the learning engine 314.

In operation 608, the system-selected restore point module 410 determines a system-selected restore point (e.g., suggested restore point) based on the heuristics analysis from the heuristic analysis module 404, the retroactive file analysis from the retroactive file analysis module 406, and the buffer time from the buffer time module 408.

Figure 7:
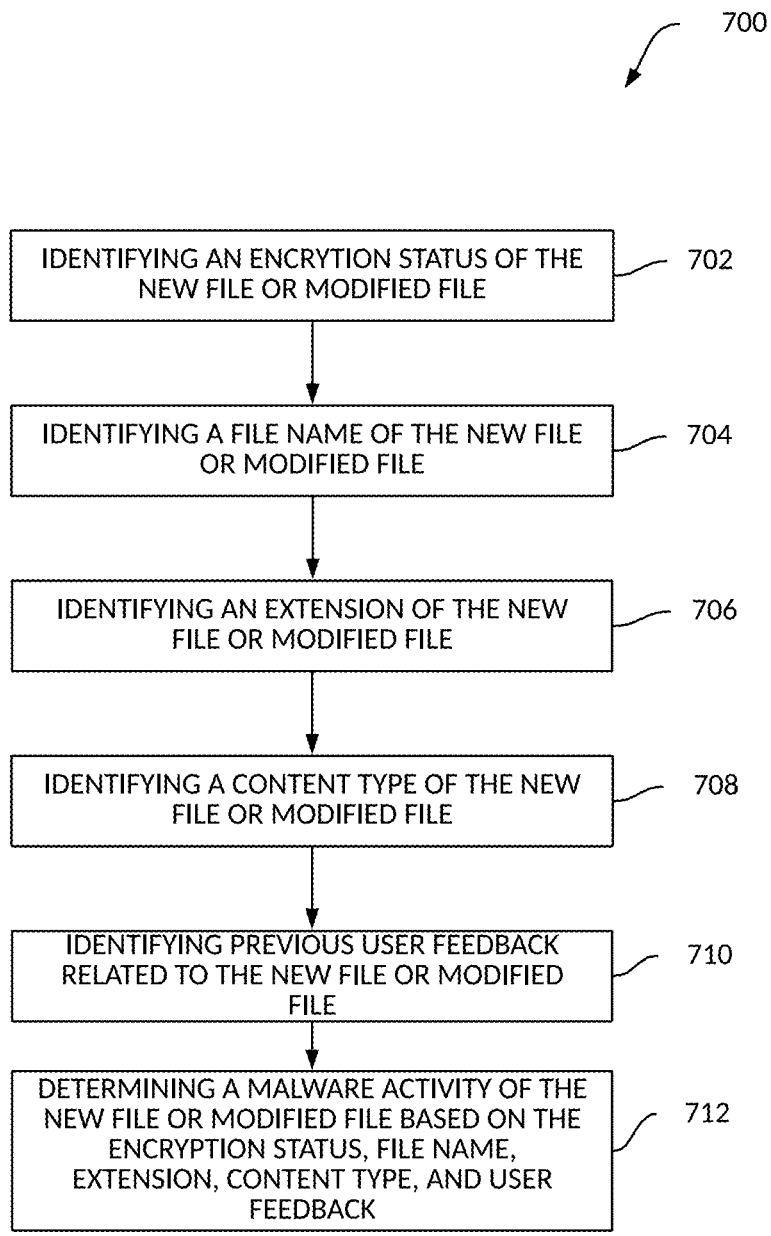
FIG. 7 is a flow diagram of a method for determining a malware activity in a storage system, in accordance with an example embodiment.

FIG. 7 is a flow diagram of a method for determining a malware activity in a storage system, in accordance with an example embodiment. Operations in the method 700 may be performed by the storage system 106, using components (e.g., modules, engines) described above with respect to FIG. 2. Accordingly, the method 700 is described by way of example with reference to the malware analysis engine 210. However, it shall be appreciated that at least some of the operations of the method 700 may be deployed on various other hardware configurations or be performed by similar components residing elsewhere. For example, some of the operations may be performed at the client device 102.

In operation 702, the encryption analysis module 304 identifies an encryption of a file. For example, the encryption analysis module 304 determines whether the file is encrypted (and if so, whether the immediate previous version of the file stored at the data storage 206 is unencrypted).

In operation 704, the file naming analysis module 306 identifies a file name of the file.

In operation 706, the file naming analysis module 306 identifies a file extension name of the file.

In operation 708, the content analysis module 308 identifies a content type of the file. For example, the content analysis module 308 determines that the content of the file does not match with the name extension of the file.

In operation 710, the user feedback module 312 identifies previous user feedback (or other users' feedback) related to the file.

In operation 712, the impacted file identification module 310 determines a malware activity of the file based on the encryption status, the file name, the extension, the content type, and the user's previous feedback.

Figure 8:
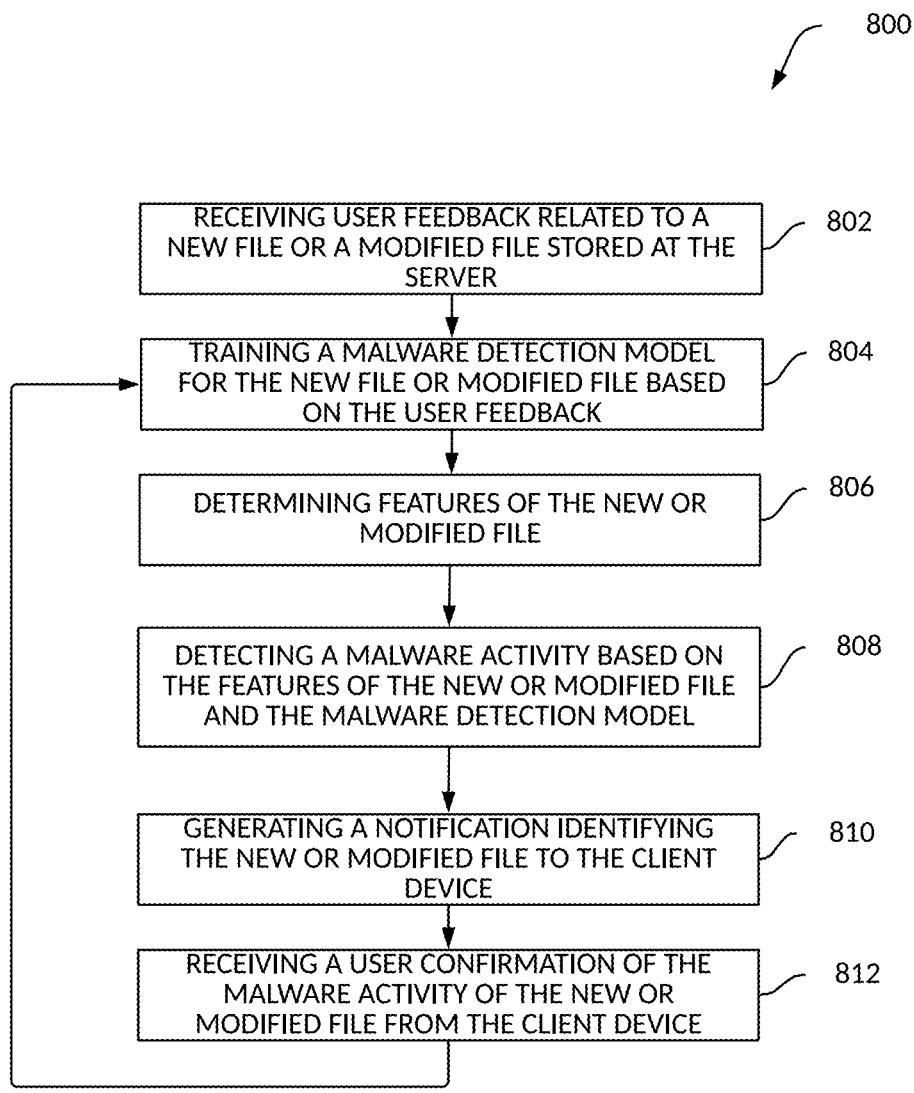
FIG. 8 is a flow diagram of a method for determining a malware activity in a storage system, in accordance with another example embodiment.

FIG. 8 is a flow diagram of a method for determining a malware activity in a storage system, in accordance with another example embodiment. Operations in the method 800 may be performed by the storage system 106, using components (e.g., modules, engines) described above with respect to FIG. 2. Accordingly, the method 800 is described by way of example with reference to the malware analysis engine 210. However, it shall be appreciated that at least some of the operations of the method 700 may be deployed on various other hardware configurations or be performed by similar components residing elsewhere. For example, some of the operations may be performed at the client device 102.

In operation 802, the user feedback module 312 receives previous user feedback (or other users' feedback) related to the file stored at the storage system 106.

In operation 804, the learning engine 314 trains a malware detection model for the file based on the user's feedback.

In operation 806, the features extraction module 302 determines features of the file. Examples of features include an encryption status, a file or extension naming pattern, a content analysis matching result, and user feedback related to files similar to the file.

In operation 808, the impacted file identification module 310 detects a ransomware activity (e.g., ransomware) based on the features of the file as previously determined in operation 806 and based on the ransomware detection model as previously determined in operation 804.

In operation 810, the communication module 216 generates a detection notification that identifies the file (based on the file identification from operation 808) as potential malware to the client device 102. The communication module 216 sends the detection notification to the client storage application 108.

In operation 812, the malware analysis engine 210 receives a user confirmation of the ransomware activity of the modified file from the client storage application 108 via the communication module 216.

Figure 9:
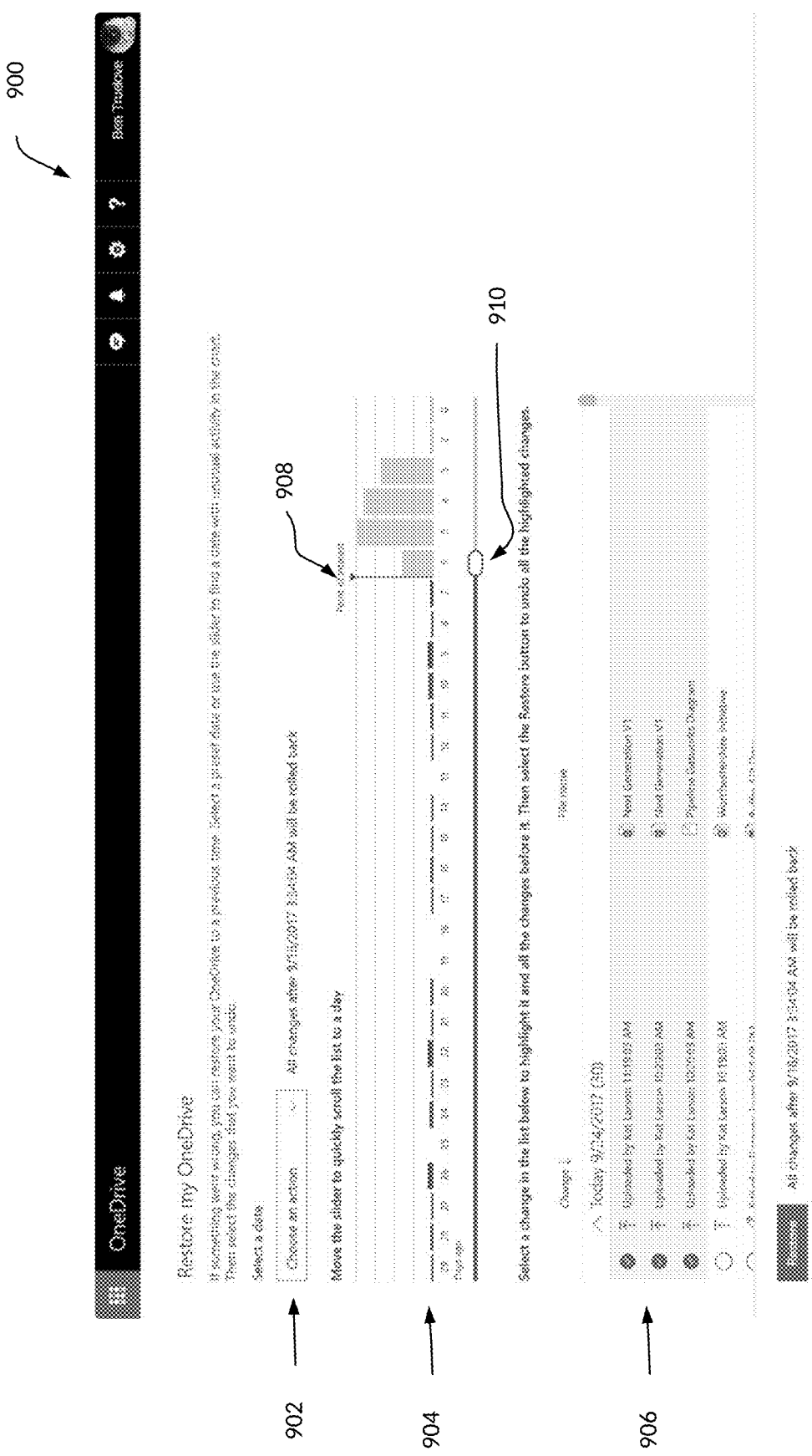
FIG. 9 is a block diagram illustrating an example of a user interface for providing a suggested restore point, in accordance with an example embodiment.

FIG. 9 is a block diagram illustrating an example of a user interface 900 for providing a suggested restore point, in accordance with an example embodiment. The restore point user interface module 214 generates a notification and recovery option as illustrated in the user interface 900. The user interface 900 includes a dropdown 902, file activity chart 904, a suggested restore point 908, a timeline slider 910, and a selectable list box 906. The dropdown 902 enables the user to select an action such as restoring the files to a particular restore date. The activity chart 904 illustrates file activity by time. For example, a higher bar graph indicates more file activities (e.g., several files being modified). The suggested restore point 908 indicates the system-selected restore point based on the file activities. For example, the suggested restore point 908 points to a restore point right before the activity chart 904 shows a large amount of file activities. The timeline slider 910 enables the user to scroll though different times to see file activities on different days. The selectable list box 906 enables the user to identify and select a specific range of actions (e.g., changes to files) to roll back. For example, the user identifies a specific restore point.

Figure 10:
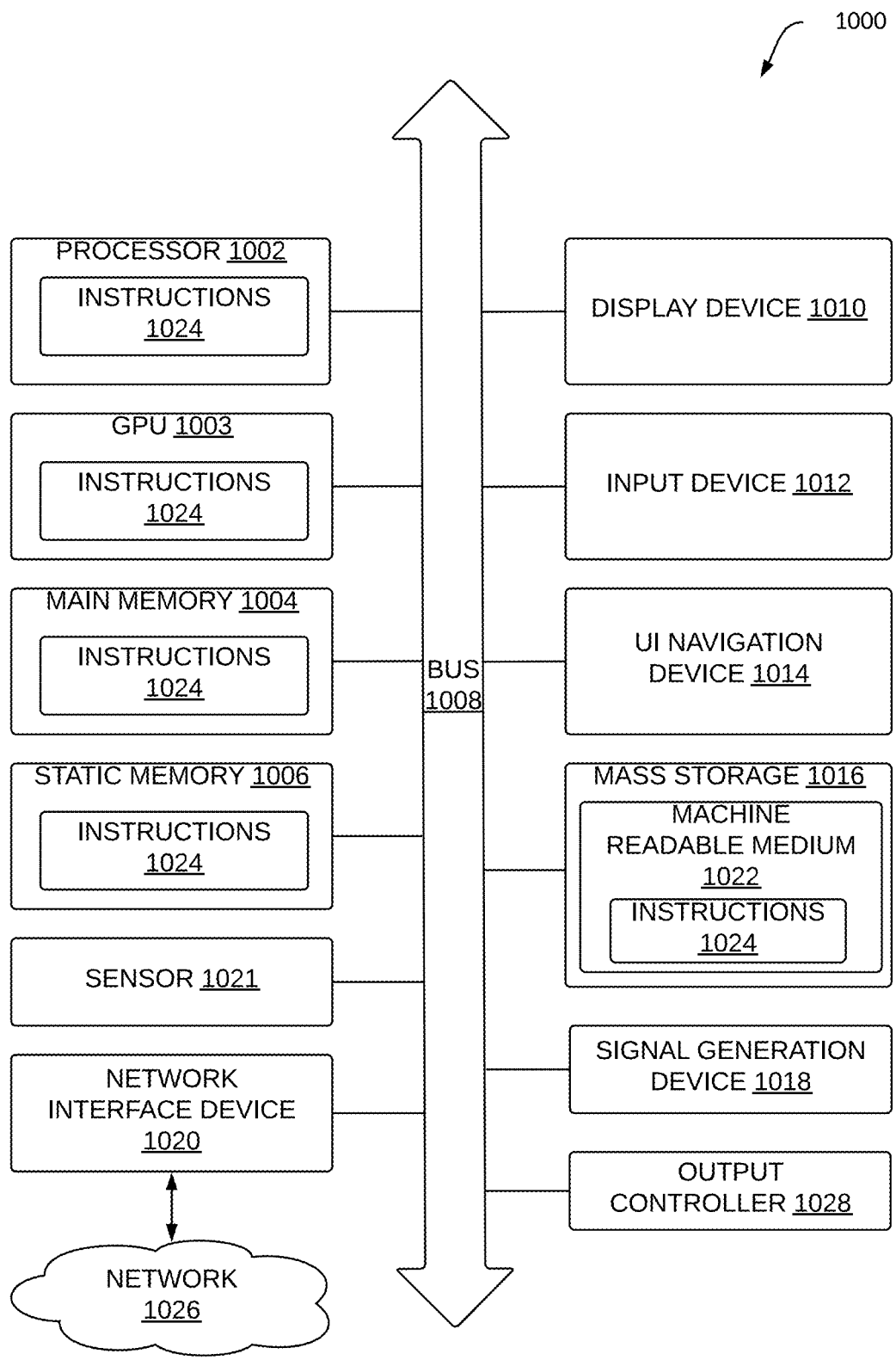
FIG. 10 is a diagrammatic representation of a machine in an example form of a computing system within which a set of instructions may be executed for causing the machine to perform any one or more of the methodologies discussed herein, according to an example embodiment.

FIG. 10 is a block diagram illustrating components of a machine 1000, according to some example embodiments, able to read instructions 1024 from a machine-storage medium 1022 and perform any one or more of the methodologies discussed herein, in whole or in part. Specifically, FIG. 10 shows the machine 1000 in the example form of a computer device (e.g., a computer) within which the instructions 1024 (e.g., software, a program, an application, an applet, an app, or other executable code) for causing the machine 1000 to perform any one or more of the methodologies discussed herein may be executed, in whole or in part.

For example, the instructions 1024 may cause the machine 1000 to execute the flows and flow diagrams of FIGS. 5-8. The instructions 1024 can transform the general, non-programmed machine 1000 into a particular machine (e.g., specially configured machine) programmed to carry out the described and illustrated functions in the manner described.

In alternative embodiments, the machine 1000 operates as a standalone device or may be connected (e.g., networked) to other machines. The machine 1000 may be a server computer, a client computer, a personal computer (PC), a tablet computer, a laptop computer, a netbook, a STB, a personal digital assistant (PDA), a cellular telephone, a smartphone, a web appliance, a network router, a network switch, a network bridge, a power adapter, or any machine 1000 capable of executing the instructions 1024, sequentially or otherwise, that specify actions to be taken by that machine 1000. Further, while only a single machine 1000 is illustrated, the term "machine" shall also be taken to include a collection of machines that individually or jointly execute the instructions 1024 to perform any one or more of the methodologies discussed herein.

The machine 1000 includes a processor 1002 (e.g., a central processing unit (CPU), a graphics processing unit (GPU) 1003, a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The processor 1002 may contain microcircuits that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein.

The machine 1000 may further include a display device 1010 (e.g., a plasma display panel (PDP), a light-emitting diode (LED) display, a liquid crystal display (LCD), a projector, a cathode ray tube (CRT), or any other display capable of displaying graphics or video). The machine 1000 may also include an alphanumeric input device 1012 (e.g., a keyboard or keypad), a user interface (UI) navigation device 1014 (e.g., a mouse, a touchpad, a trackball, a joystick, a motion sensor, an eye tracking device, or another pointing instrument), a storage unit 1016, a signal generation device 1018 (e.g., a sound card, an amplifier, a speaker, a headphone jack, or any suitable combination thereof), a network interface device 1020, and one or more sensors 1021, such as a Global Positioning System (GPS) sensor, compass, accelerometer, or another sensor. The machine 1000 may include an output controller 1028, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The storage unit 1016 includes the machine-storage medium 1022 on which are stored the instructions 1024 embodying any one or more of the methodologies or functions described herein. The instructions 1024 may also reside, completely or at least partially, within the processor 1002, the GP 1003, main memory 1004, the static memory 1006, or the machine storage medium 1022 before or during execution thereof by the machine 1000. Accordingly, the main memory 1004 and the processor 1002 may be considered machine-storage media 1022 (e.g., tangible and non-transitory machine-readable media).

In some example embodiments, the machine 1000 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a Global Positioning System (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 1004, 1006, and/or the memory of the processor(s) 1002) and/or the storage unit 1016 may store one or more sets of instructions 1024 and data structures (e.g., software) embodying or utilized by any one or more of the methodologies or functions described herein. These instructions, when executed by the processor(s) 1002, cause various operations to implement the disclosed embodiments.

As used herein, the terms "machine-storage medium," "device-storage medium," "computer-storage medium" (referred to collectively as "machine-storage medium 1022") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1022 include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and signal media. Thus, the terms include both storage devices/media and carrier waves/modulated data signals.

The instructions 1024 may further be transmitted or received over a communication network 1026 using a transmission medium via the network interface device 1020 and utilizing any one of a number of well-known transfer protocols (e.g., HTTP). Examples of communication networks 1026 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" or "signal medium" shall be taken to include any intangible medium that is capable of storing, encoding, or carrying the instructions 1024 for execution by the machine 1000, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium 1022 or in a signal medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 1002 or a group of processors 1002) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

EXAMPLES

Example 1 is a computer-implemented method. The method comprises: accessing, by a cloud storage server, a plurality of server-stored files of a cloud storage account of a client device;
determining that one or more compromised server-stored files from the plurality of server-stored files are affected by a malware activity;
determining a plurality of recovery options based on an identification of the one or more compromised server-stored files and the time at which the one or more compromised server-stored files became affected by the malware activity, the plurality of recovery options comprising a suggested restore point identifying a restore time to which changes to the one or more compromised server-stored files are reverted; and
transmitting a recovery notification to the client device, the recovery notification indicating the plurality of recovery options.

In example 2, the subject matter of example 1 can optionally include: determining features of a server-stored file of the plurality of the server-stored files based on a change in the server-stored file; and
detecting the malware activity on the server-stored file based on the features of the server-stored file.

In example 3, the subject matter of example 1 can optionally include:
identifying one or more modified server-stored files of the plurality of server-stored files changed at about a time at which the one or more compromised server-stored files became affected by the malware activity;
determining features of the one or more modified server-stored files based on a change in the one or more modified server-stored files; and
detecting the malware activity on the one or more modified server-stored files based on the features of the one or more modified server-stored files.

In example 4, the subject matter of example 1 can optionally include wherein the plurality of recovery options comprises restoring the cloud storage account to one of a plurality of cloud storage server restore times, and restoring one or more compromised server-stored files to an uncompromised version of the one or more compromised server-stored files.

In example 5, the subject matter of example 4 can optionally include:
receiving, from the client device, a selection of a cloud storage server restore time from the plurality of cloud storage server restore times; and
restoring the cloud storage account to a version of the cloud storage account corresponding to the selection of the cloud storage server restore time.

In example 6, the subject matter of example 4 can optionally include:
receiving, from the client device, a selection of the one or more compromised server-stored files; and
restoring the one or more compromised server-stored files, at both the client device and the cloud storage server, to the uncompromised version of the one or more compromised server-stored files.

In example 7, the subject matter of example 4 can optionally include:
receiving, from the client device, a selection of cloud storage server restore time;
computing a buffer time based on the selected cloud storage server restore time and the suggested restore point, the buffer time configured to be added to a future suggested restore point.

In example 8, the subject matter of example 4 can optionally include:
determining a buffer time based on the features of the plurality of the server-stored files; and
generating the plurality of storage server restore times based on the buffer time and the time at which the one or more compromised server-stored files became affected by the malware activity.

In example 9, the subject matter of example 1 can optionally include wherein determining features of the plurality of server-stored file comprises:
identifying an encryption status of the at least one server-stored file based on an entropy of the at least one server-stored file determined based on the change from the at least one server-stored file to at least one modified server-stored file;
identifying a file name of the at least one modified server-stored file;
identifying an extension of the least one modified server-stored file;
identifying a content type of the least one modified server-stored file; and identifying a previous user feedback based on the at least one modified server-stored file.

In example 10, the subject matter of example 9 can optionally include wherein detecting the malware activity comprises:
determining that the at least one server-stored file is unencrypted and that the at least one modified server-stored file is encrypted based on the encryption status of the at least one modified server-stored file;
determining that the extension of the at least one modified server-stored file is indicative of the malware activity;
determining that the file name of the at least one modified server-stored file is indicative of the malware activity; and
determining that the content type of the at least one modified server-stored file does not correspond with a content associated with the extension of the at least one modified server-stored file.

Example 11 is a system. The system comprises:
one or more hardware processors; and
a memory storing instructions that, when executed by the one or more hardware processors, cause the one or more hardware processors to perform operations comprising:
accessing, by a cloud storage server, a plurality of server-stored files of a cloud storage account of a client device;
determining that one or more compromised server-stored files from the plurality of server-stored files are affected by a malware activity;
determining a plurality of recovery options based on an identification of the one or more compromised server-stored files and the time at which the one or more compromised server-stored files became affected by the malware activity, the plurality of recovery options comprising a suggested restore point identifying a restore time to which changes to the one or more compromised server-stored files are reverted; and
transmitting a recovery notification to the client device, the recovery notification indicating the plurality of recovery options.

In example 12, the subject matter of example 11 can optionally include:
determining features of a server-stored file of the plurality of the server-stored files based on a change in the server-stored file; and
detecting the malware activity on the server-stored file based on the features of the server-stored file.

In example 12, the subject matter of example 11 can optionally include:
identifying one or more modified server-stored files of the plurality of server-stored files changed at about a time at which the one or more compromised server-stored files became affected by the malware activity;
determining features of the one or more modified server-stored files based on a change in the one or more modified server-stored files; and
detecting the malware activity on the one or more modified server-stored files based on the features of the one or more modified server-stored files.

In example 12, the subject matter of example 11 can optionally include, wherein the plurality of recovery options comprises restoring the cloud storage account to one of a plurality of cloud storage server restore times, and restoring one or more compromised server-stored files to an uncompromised version of the one or more compromised server-stored files.

In example 15, the subject matter of example 11 can optionally include:

receiving, from the client device, a selection of a cloud storage server restore time from the plurality of cloud storage server restore times; and
restoring the cloud storage account to a version of the cloud storage account corresponding to the selection of the cloud storage server restore time.

In example 16, the subject matter of example 11 can optionally include:
receiving, from the client device, a selection of the one or more compromised server-stored files; and
restoring the one or more compromised server-stored files, at both the client device and the cloud storage server, to the uncompromised version of the one or more compromised server-stored files.

In example 17, the subject matter of example 11 can optionally include:
receiving, from the client device, a selection of cloud storage server restore time;
computing a buffer time based on the selected cloud storage server restore time and the suggested restore point, the buffer time configured to be added to a future suggested restore point.

In example 18, the subject matter of example 14 can optionally include:
determining a buffer time based on the features of the plurality of the server-stored files; and
generating the plurality of storage server restore times based on the buffer time and the time at which the one or more compromised server-stored files became affected by the malware activity.

In example 19, the subject matter of example 11 can optionally include wherein determining features of the plurality of server-stored file comprises:
identifying an encryption status of the at least one server-stored file based on an entropy of the at least one server-stored file determined based on the change from the at least one server-stored file to at least one modified server-stored file;
identifying a file name of the at least one modified server-stored file;
identifying an extension of the least one modified server-stored file;
identifying a content type of the least one modified server-stored file; and
identifying a previous user feedback based on the at least one modified server-stored file.

Example 20 is a machine-storage medium storing instructions that, when executed by one or more processors of a machine, cause the one or more processors to perform operations comprising:
accessing, by a cloud storage server, a plurality of server-stored files of a cloud storage account of a client device;
determining that one or more compromised server-stored files from the plurality of server-stored files are affected by a malware activity;
determining a plurality of recovery options based on an identification of the one or more compromised server-stored files and the time at which the one or more compromised server-stored files became affected by the malware activity, the plurality of recovery options comprising a suggested restore point identifying a restore time to which changes to the one or more compromised server-stored files are reverted; and
transmitting a recovery notification to the client device, the recovery notification indicating the plurality of recovery options.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A computer-implemented method comprising:

accessing, by a cloud storage server, a plurality of server-stored files of a cloud storage account of a client device;

determining that one or more compromised server-stored files from the plurality of server-stored files are affected by a malware activity;

identifying an infection time at which the one or more compromised server-stored files became affected by the malware activity;

computing a buffer time based on previously selected cloud storage server restore times relative to corresponding previously suggested restore points, wherein the buffer time is added or reduced to the restore time of the detected malware attack to ensure a safe restore time;

determining a plurality of recovery options based on an identification of the one or more compromised server-stored files and the infection time at which the one or more compromised server-stored files became affected by the malware activity, the plurality of recovery options comprising a suggested restore point identifying, based on the infection time and the buffer time, a restore time to which changes to the one or more compromised server-stored files are reverted;

transmitting a recovery notification to the client device, the recovery notification indicating the plurality of recovery options; and receiving a user-selected restore point from a client storage application of the client device and a server storage application within the cloud storage server restores the cloud storage account at the user-selected restore point.

2. The computer-implemented method of claim 1, further comprising:

determining features of a server-stored file of the plurality of the server-stored files based on a change in the server-stored file; and detecting the malware activity on the server-stored file based on the features of the server-stored file.

3. The computer-implemented method of claim 1, further comprising:

identifying one or more modified server-stored files of the plurality of server-stored files changed at about a time at which the one or more compromised server-stored files became affected by the malware activity;

determining features of the one or more modified server-stored files based on a change in the one or more modified server-stored files; and detecting the malware activity on the one or more modified server-stored files based on the features of the one or more modified server-stored files.

4. The computer-implemented method of claim 1, wherein the plurality of recovery options comprises restoring the cloud storage account to one of a plurality of cloud storage server restore times, and restoring one or more compromised server-stored files to an uncompromised version of the one or more compromised server-stored files.

5. The computer-implemented method of claim 4, further comprising: receiving, from the client device, a selection of a cloud storage server restore time from the plurality of cloud storage server restore times; and restoring the cloud storage account to a version of the cloud storage account corresponding to the selection of the cloud storage server restore time.

6. The computer-implemented method of claim 4, further comprising:

receiving, from the client device, a selection of the one or more compromised server-stored files; and restoring the one or more compromised server-stored files, at both the client device and the cloud storage server, to the uncompromised version of the one or more compromised server-stored files.

7. The computer-implemented method of claim 4, further comprising:

receiving, from the client device, a selection of cloud storage server restore time;

adjusting the buffer time based on the selected cloud storage server restore time and the suggested restore point, the buffer time configured to be added to a future suggested restore point.

8. The computer-implemented method of claim 4, further comprising:

adjusting the buffer time based on the features of the plurality of the server-stored files; and generating the plurality of storage server restore times based on the buffer time and the time at which the one or more compromised server-stored files became affected by the malware activity.

9. The computer-implemented method of claim 1, wherein determining features of the plurality of server-stored file comprises:

identifying an encryption status of the at least one server-stored file based on an entropy of the at least one server-stored file determined based on the change from the at least one server-stored file to at least one modified server-stored file;

identifying a file name of the at least one modified server-stored file;

identifying an extension of the least one modified server-stored file;

identifying a content type of the least one modified server-stored file; and identifying a previous user feedback based on the at least one modified server-stored file.

10. The computer-implemented method of claim 9, further comprising:
 determining that the at least one server-stored file is unencrypted and that the at least one modified server-stored file is encrypted based on the encryption status of the at least one modified server-stored file;
 determining that the extension of the at least one modified server-stored file is indicative of the malware activity;
 determining that the file name of the at least one modified server-stored file is indicative of the malware activity; and
 determining that the content type of the at least one modified server-stored file does not correspond with a content associated with the extension of the at least one modified server-stored file.

11. A system comprising: one or more hardware processors; and a memory storing instructions that, when executed by the one or more hardware processors, cause the one or more hardware processors to perform operations comprising:
 accessing, by a cloud storage server, a plurality of server-stored files of a cloud storage account of a client device;
 determining that one or more compromised server-stored files from the plurality of server-stored files are affected by a malware activity;
 identifying an infection time at which the one or more compromised server-stored files became affected by the malware activity;
 computing a buffer time based on previously selected cloud storage server restore times relative to corresponding previously suggested restore points, wherein the buffer time is added or reduced to the restore time of the detected malware attack to ensure a safe restore time;
 determining a plurality of recovery options based on an identification of the one or more compromised server-stored files and the infection time at which the one or more compromised server-stored files became affected by the malware activity, the plurality of recovery options comprising a suggested restore point identifying, based on the infection time and the buffer time, a restore time to which changes to the one or more compromised server-stored files are reverted;
 transmitting a recovery notification to the client device, the recovery notification indicating the plurality of recovery options; and
 receiving a user-selected restore point from a client storage application of the client device and a server storage application within the cloud storage server restores the cloud storage account at the user-selected restore point.

12. The system of claim 11, wherein the operations further comprise:
 determining features of a server-stored file of the plurality of the server-stored files based on a change in the server-stored file; and
 detecting the malware activity on the server-stored file based on the features of the server-stored file.

13. The system of claim 11, wherein the operations further comprise:
 identifying one or more modified server-stored files of the plurality of server-stored files changed at about a time at which the one or more compromised server-stored files became affected by the malware activity;
 determining features of the one or more modified server-stored files based on a change in the one or more modified server-stored files; and
 detecting the malware activity on the one or more modified server-stored files based on the features of the one or more modified server-stored files.

14. The system of claim 11, wherein the plurality of recovery options comprises restoring the cloud storage account to one of a plurality of cloud storage server restore times, and restoring one or more compromised server-stored files to an uncompromised version of the one or more compromised server-stored files.

15. The system of claim 14, wherein the operations further comprise:
 receiving, from the client device, a selection of the one or more compromised server-stored files; and
 restoring the one or more compromised server-stored files, at both the client device and the cloud storage server, to the uncompromised version of the one or more compromised server-stored files.

16. The system of claim 14, wherein the operations further comprise:
 adjusting the buffer time based on the features of the plurality of the server-stored files; and
 generating the plurality of storage server restore times based on the buffer time and the time at which the one or more compromised server-stored files became affected by the malware activity.

17. The system of claim 11, wherein the operations further comprise:
 receiving, from the client device, a selection of a cloud storage server restore time from a plurality of cloud storage server restore times; and
 restoring the cloud storage account to a version of the cloud storage account corresponding to the selection of the cloud storage server restore time.

18. The system of claim 11, wherein the operations further comprise:
 receiving, from the client device, a selection of cloud storage server restore time;
 adjusting the buffer time based on the selected cloud storage server restore time and the suggested restore point, the buffer time configured to be added to a future suggested restore point.

19. The system of claim 11, wherein determining features of the plurality of server-stored file comprises:
 identifying an encryption status of the at least one server-stored file based on an entropy of the at least one server-stored file determined based on the change from the at least one server-stored file to at least one modified server-stored file;
 identifying a file name of the at least one modified server-stored file;
 identifying an extension of the least one modified server-stored file;

identifying a content type of the least one modified server-stored file; and identifying a previous user feedback based on the at least one modified server-stored file.

20. A non-transitory machine-storage medium storing instructions that, when executed by one or more processors of a machine, cause the one or more processors to perform operations comprising:

accessing, by a cloud storage server, a plurality of server-stored files of a cloud storage account of a client device;

determining that one or more compromised server-stored files from the plurality of server-stored files are affected by a malware activity;

identifying an infection time at which the one or more compromised server-stored files became affected by the malware activity;

computing a buffer time based on previously selected cloud storage server restore times relative to corresponding previously suggested restore points;

determining a plurality of recovery options based on an identification of the one or more compromised server-stored files and the infection time at which the one or more compromised server-stored files became affected by the malware activity, the plurality of recovery options comprising a suggested restore point identifying, based on the infection time and the buffer time, a restore time to which changes to the one or more compromised server-stored files are reverted;

transmitting a recovery notification to the client device, the recovery notification indicating the plurality of recovery options; and receiving a user-selected restore point from a client storage application of the client device and a server storage application within the cloud storage server restores the cloud storage account at the user-selected restore point.

* * * * *